United States Patent
Ushio

(10) Patent No.: US 10,460,721 B2
(45) Date of Patent: Oct. 29, 2019

(54) DIALOGUE ACT ESTIMATION METHOD, DIALOGUE ACT ESTIMATION APPARATUS, AND STORAGE MEDIUM

(71) Applicant: Panasonic Intellectual Property Management Co., Ltd., Osaka (JP)

(72) Inventor: Takashi Ushio, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/615,856

(22) Filed: Jun. 7, 2017

(65) Prior Publication Data

US 2017/0372694 A1    Dec. 28, 2017

(30) Foreign Application Priority Data

Jun. 23, 2016    (JP) .................................. 2016-124900

(51) Int. Cl.
*G10L 15/06*    (2013.01)
*G10L 15/16*    (2006.01)
(Continued)

(52) U.S. Cl.
CPC ............ *G10L 15/063* (2013.01); *G10L 15/16* (2013.01); *G10L 15/1815* (2013.01);
(Continued)

(58) Field of Classification Search
CPC .............................. G10L 15/063; G10L 17/22
(Continued)

(56) References Cited

U.S. PATENT DOCUMENTS

2014/0136212 A1* 5/2014 Kwon .................... G10L 15/22
                                                    704/275
2015/0170640 A1* 6/2015 Sak ......................... G10L 15/16
                                                    704/232

(Continued)

FOREIGN PATENT DOCUMENTS

| JP | 11-259089 | 9/1999 |
| JP | 2000-259628 | 9/2000 |
| JP | 2013-045363 | 3/2013 |

OTHER PUBLICATIONS

Stolcke, Andreas, et al. "Dialogue act modeling for automatic tagging and recognition of conversational speech." Computational linguistics 26.3 (2000): 339-373. (Year: 2000).*

(Continued)

*Primary Examiner* — Shaun Roberts
(74) *Attorney, Agent, or Firm* — Greenblum & Bernstein, P.L.C.

(57) ABSTRACT

A dialogue act estimation method, in a dialogue act estimation apparatus, includes acquiring first training data indicating, in a mutually associated manner, text data of a first sentence that can be a current uttered sentence, and text data of a second sentence that can be an uttered sentence immediately previous to the first sentence. The method also includes speaker change information indicating whether a speaker of the first sentence is the same as a speaker of the second sentence, and dialogue act information indicating a class of the first sentence. The method further includes learning an association between the current uttered sentence and the dialogue act information by applying the first training data to a model, and storing a result of the learning as learning result information in a memory.

6 Claims, 14 Drawing Sheets

(51) Int. Cl.
   *G10L 15/18*     (2013.01)
   *G10L 15/22*     (2006.01)
   *G10L 17/22*     (2013.01)
   *G10L 21/0272*   (2013.01)

(52) U.S. Cl.
   CPC .............. *G10L 15/22* (2013.01); *G10L 17/22* (2013.01); *G10L 21/0272* (2013.01)

(58) Field of Classification Search
   USPC ................................................. 704/231, 232
   See application file for complete search history.

(56) References Cited

U.S. PATENT DOCUMENTS

| 2016/0154782 A1* | 6/2016 | Romano | H04M 3/5175 |
|---|---|---|---|
| | | | 704/9 |
| 2016/0210551 A1* | 7/2016 | Lee | G06F 17/27 |

OTHER PUBLICATIONS

Extended European Search Report, dated Oct. 17, 2017 from the European Patent Office (EPO), for the related European Patent Application No. 17176522.5.

Samira Ben Dbabis, Hatem Ghorbel, Lamia Hadrich Belguith, and Mohamed Kallel: "Automatic Dialogue Act Annotation within Arabic Debates" ; "467" In: Computational Linguistics and Intelligent Text Processing:Apr. 14, 2015 (Apr. 14, 2015), XP047311569.

Nal Kalchbrenner et al., "Recurrent Convolutional Neural Networks for Discourse Compositionality", arXiv preprint arXiv:1306.3564, Jun. 15, 2013.

* cited by examiner

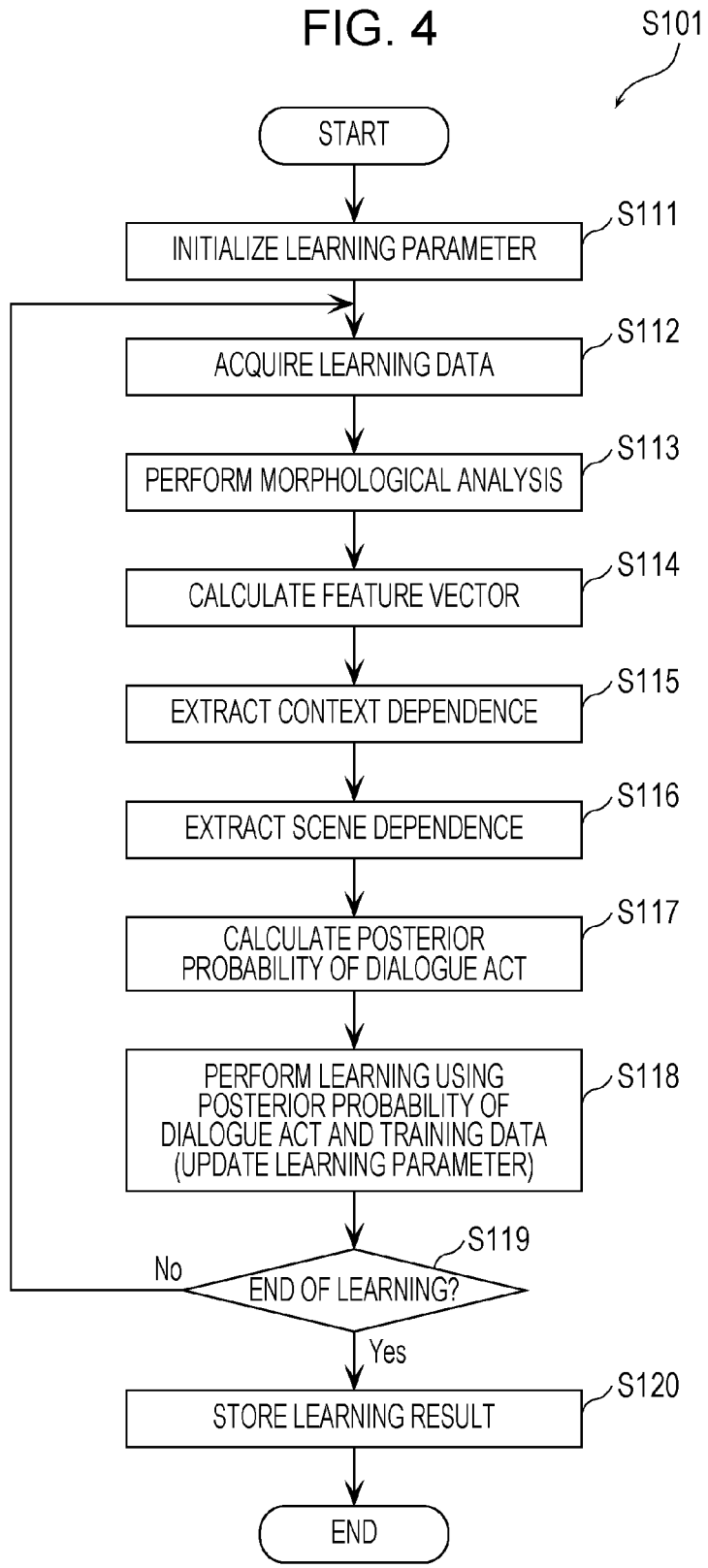

FIG. 5

| DIALOGUE ID | TIME | DIALOGUE ACT | SPEAKER IDENTIFICATION | SPEAKER CHANGE INFORMATION | SENTENCE |
|---|---|---|---|---|---|
| 2434 | 0 | Wh-Question | B | DIALOGUE START | tv uh well what would you say your opinion is on gun control |
| 2434 | 1 | Hedge | A | RESPONSE | A:h:well i don't know |
| 2434 | 2 | Statement | A | CONTINUOUS UTTERANCE | i've i've had mixed emotions i guess when i listen to uh the radio and and watch t v about the different uh things that are happening |
| 2434 | 3 | Statement | A | CONTINUOUS UTTERANCE | uh i'm against it |
| 2434 | 4 | Statement | A | CONTINUOUS UTTERANCE | but on the same token uh i went out and purchased a gun just because i wanted the right to do that laugher |
| 2434 | 5 | Uninterpretable | B | RESPONSE | ye |
| 2434 | 6 | Statement | A | RESPONSE | so i i have a rifle in the house |
| ... | ... | ... | ... | ... | ... |

FIG. 6

| DIALOGUE ID | TIME | DIALOGUE ACT | SPEAKER IDENTIFICATION | SPEAKER CHANGE INFORMATION | SENTENCE |
|---|---|---|---|---|---|
| 2001 | 0 | QUESTION | B | DIALOGUE START | What is the problem, today? |
| 2001 | 1 | STATEMENT-CHIEF SYMPTOM COMPLAINT | A | RESPONSE | I have a headache. |
| 2001 | 2 | QUESTION | B | RESPONSE | You have a headache. Anything else? |
| 2001 | 3 | RESPONSE-DENIAL | A | RESPONSE | No. |
| 2001 | 4 | APPRECIATION | B | RESPONSE | Thank you. |
| 2001 | 5 | QUESTION | B | CONTINUOUS UTTERANCE | Well, let me ask you some questions about your symptom. Shall we start? |
| 2001 | 6 | RESPONSE-AFFIRMATION | A | RESPONSE | Yes. |
| ... | ... | ... | ... | ... | ... |

FIG. 12

| TIME | SPEAKER IDENTIFICATION | SPEAKER CHANGE INFORMATION | UTTERED SENTENCE | PREDICTED DIALOGUE ACT |
|---|---|---|---|---|
| 5 | A | CONTINUOUS UTTERANCE | i don't think it's a bad idea | opinion |
| 6 | A | CONTINUOUS UTTERANCE | teaches teaches a lot | opinion |
| 7 | A | CONTINUOUS UTTERANCE | i mean i went in the service when i was eighteen | Statement |
| 8 | B | RESPONSE | Uhhuh | Acknowledge (Backchannel) |
| 9 | B | CONTINUOUS UTTERANCE | is that right | Backchannel in question form |
| 10 | A | RESPONSE | yeah | Yes answers |

FIG. 13

| TIME | SPEAKER IDENTIFICATION | SPEAKER CHANGE INFORMATION | UTTERED SENTENCE | PREDICTED DIALOGUE ACT |
|---|---|---|---|---|
| 1 | A | DIALOGUE START | Hello, ***. Tell me about your symptom. | QUESTION |
| 2 | B | RESPONSE | I have had a splitting headache since yesterday. | STATEMENT-CHIEF SYMPTOM COMPLAINT |
| 3 | A | RESPONSE | You have a headache. Anything else? | QUESTION |
| 4 | B | RESPONSE | Uhhm, let me see. | OTHER |
| 5 | B | CONTINUOUS UTTERANCE | I am concerned about... | OTHER |
| 6 | B | CONTINUOUS UTTERANCE | I am worrying about why I sweat terribly on my hands. | STATEMENT-CHIEF SYMPTOM COMPLAINT | ent;
DIALOGUE ACT ESTIMATION METHOD, DIALOGUE ACT ESTIMATION APPARATUS, AND STORAGE MEDIUM

BACKGROUND

1. Technical Field

The present disclosure relates to a method of estimating a dialogue act to which an uttered sentence is classified, a dialogue act estimation apparatus, and a storage medium.

2. Description of the Related Art

A dialogue act estimation technique is a technique for converting an utterance of a user to a dialogue act indicating a meaning of the utterance. A related technique for such a purpose is to learn a word or phrase having a high occurrence frequency and contributing to a dialogue act as a feature of an utterance by using a dialogue act corpus in which a dialogue act of each utterance is defined (see, for example, Japanese Patent No. 3016779 and Japanese Patent No. 3059413). In another related technique, a context-dependent dialogue act is learned using not only words and phrases but also context information (particularly, an immediately previous utterance) (see, for example, Japanese Patent No. 5591772 and Nal Kalchbrenner, Phil Blunsom, "Recurrent Convolutional Neural Networks for Discourse Compositionality", arXiv preprint arXiv: 1306.3584, 2013).

In the dialogue act estimation techniques, there is a need for a further improvement in accuracy.

SUMMARY

One non-limiting and exemplary embodiment provides a dialogue act estimation method, a dialogue act estimation apparatus, and a storage medium capable of providing improved accuracy.

In one general aspect, the techniques disclosed here feature a dialogue act estimation method, in a dialogue act estimation apparatus, including acquiring first training data indicating, in a mutually associated manner, text data of a first sentence that can be a current uttered sentence, text data of a second sentence that can be an uttered sentence immediately previous to the first sentence, first speaker change information indicating whether a speaker of the first sentence is the same as a speaker of the second sentence, and dialogue act information indicating a class of the first sentence, learning an association between the current uttered sentence and the dialogue act information by applying the first training data to a model, and storing a result of the learning as learning result information in a memory.

The present disclosure provides a dialogue act estimation method or a dialogue act estimation apparatus capable of providing improved accuracy.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a flow chart illustrating a learning process according to an embodiment;

FIG. 5 is a diagram illustrating an example of a training corpus according to an embodiment;

FIG. 6 is a diagram illustrating an example of a training corpus according to an embodiment;

FIG. 12 is a diagram illustrating an example of an estimation result according to an embodiment;

FIG. 13 is a diagram illustrating an example of an estimation result according to an embodiment;

DETAILED DESCRIPTION

Figure 1:
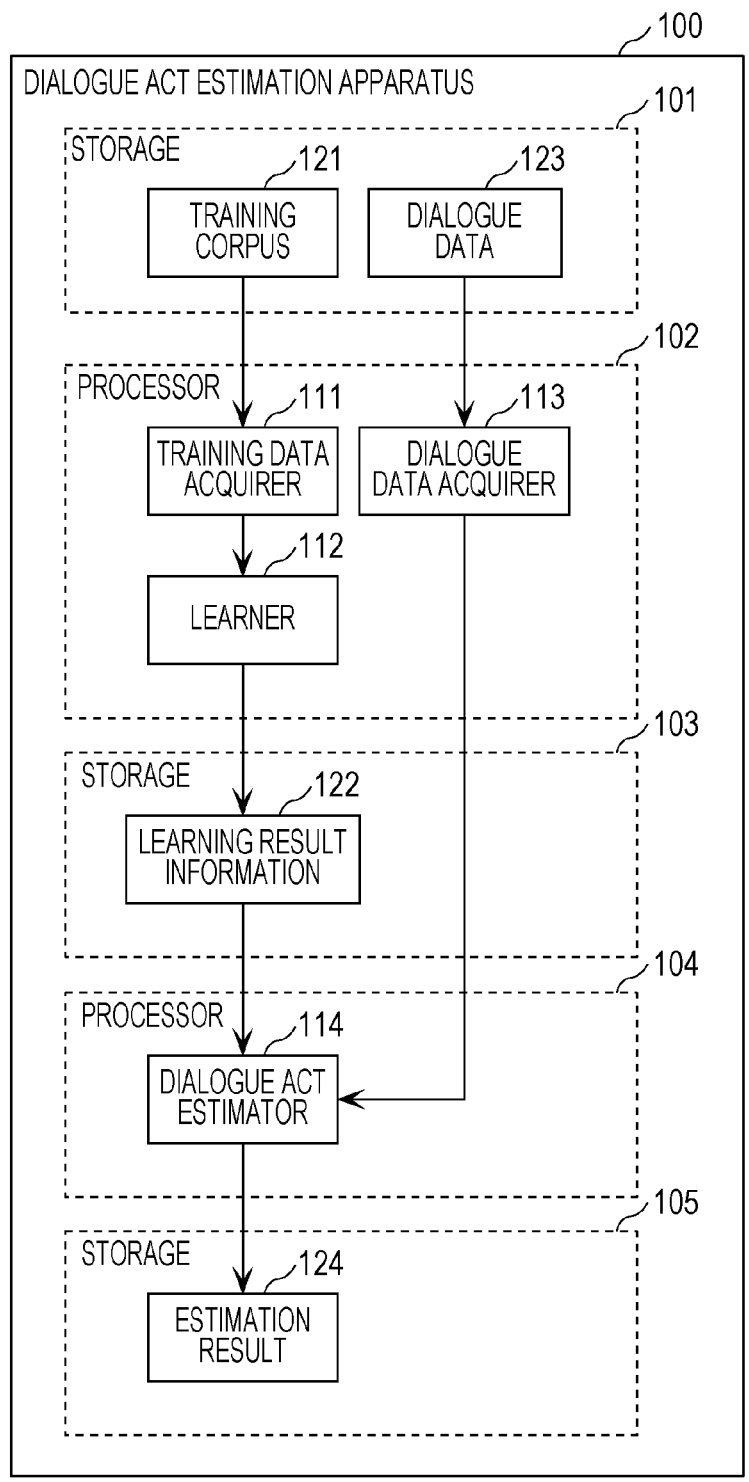
FIG. 1 is a block diagram illustrating a configuration of a dialogue act estimation apparatus according to an embodiment.

Underlying Knowledge Forming Basis of the Present Disclosure

Japanese Patent No. 3016779 describes a problem with a low comprehension rate in recognizing a combination of a concept and a dialogue act expressed in an interlanguage using a minimum recognition error approach based on learning data including a pair of a speech recognition result and interlanguage data. To solve this problem, a speech recognition result is converted to a series of utterance acts and concepts or combinations of concepts by using an estimation based on a finite-state automaton for concept estimation and utterance act estimation and reranking based on a bigram model using a plurality of concepts and combinations of concepts.

In the technique disclosed in Japanese Patent No. 3059413, to solve a problem similar to that described in Japanese Patent No. 3016779, the comprehension rate in recognizing a combination of a dialogue act and a concept is improved using a restriction depending on an utterance act included in a natural uttered sentence and a restriction depending on a combination among semantic concepts included in the natural uttered sentence.

However, in the techniques disclosed in Japanese Patent No. 3016779 and Japanese Patent No. 3059413, after a long uttered sentence of a speaker is subjected to preprocessing to divide it into a plurality of pieces, and a series of dialogue acts is output without taking into account dependence on a context of previous utterances. Therefore, it is difficult to apply these techniques to prediction of details of a dialogue act having a hierarchical relationship or similarity. Thus, it is necessary to use not only context information on an utterance of a speaker but also context information on an utterance of a dialogue partner.

Japanese Patent No. 5591772 describes a problem that clustering of utterances is performed assuming that utterances in a dialogue are independent of each other, and thus important context information included in dialogue data of successive utterances is not used, which makes it difficult to achieve good enough clustering accuracy or a good enough estimation of the number of dialogue acts. To solve the problem described above, a plurality of utters described in a time-series manner in dialogue data are clustered into first clusters based on extracted feature values of the respective utterances, and the first clusters are further clustered into second clusters based on the feature values of the respective utters and context information of the utters (in particular an immediately previous utter), and then the degree of dependence on the context is estimated based on the results of the first and second clusters.

As in Japanese Patent No. 5591772, a technique paper written by Nal Kalchbrenner and Phil Blunsom titled "Recurrent Convolutional Neural Networks for Discourse Compositionality" (arXiv preprint arXiv: 1306.3584, 2013) also describes a problem that important context information included in dialogue data of successive utterances is not used. To solve this problem, it is proposed to use a model in which speakers are distinguished and feature values of successive utterances in the dialogue data are detected for each speaker, and learning is performed using a recurrent neural network, which is a time-series model, to extract context dependence while distinguishing between utterances of a speaker and utterances of another speaker.

However, the technique disclosed in Japanese Patent No. 5591772 and the technique disclosed in Nal Kalchbrenner, Phil Blunsom, "Recurrent Convolutional Neural Networks for Discourse Compositionality" (arXiv preprint arXiv: 1306.3584, 2013) both have a similar problem that when, in learning, it is tried to use context information of not only an immediately previous utterance but also further previous utterances, a problem associated with data sparseness occurs, that is, context information with a low occurrence frequency is not learned, and thus it is difficult for the context information to make a contribution to performance of conversion of a general dialogue act. Learning of context information with a low occurrence frequency is not performed in particular when the dialogue act corpus includes a small number of utterances, which makes it difficult to improve the performance of conversion of general dialogue acts.

In an aspect of the present disclosure, a dialogue act estimation method, in a dialogue act estimation apparatus, includes acquiring first training data indicating, in a mutually associated manner, text data of a first sentence that can be a current uttered sentence, text data of a second sentence that can be an uttered sentence immediately previous to the first sentence, first speaker change information indicating whether a speaker of the first sentence is the same as a speaker of the second sentence, and dialogue act information indicating a class of the first sentence, learning an association between the current uttered sentence and the dialogue act information by applying the first training data to a model, storing a result of the learning as learning result information in a memory.

In this method, learning is performed using speaker change information indicating whether a speaker of a current sentence is the same as a speaker of an immediately previous sentence. This allows an increase in accuracy in associating an uttered sentence with dialogue act information.

By using training data including two or more successive sentences necessary in estimating a detailed dialogue act, it is possible to improve the performance of conversion of a general dialogue act, although it is difficult to collect a large scale of data. By additionally collecting a large-scale training corpus including a collection of only two or more successive utterances, which are easy to collect, it is possible to achieve a further improvement in accuracy.

For example, the first training data may further include first speaker identification information indicating the speaker of the first sentence and second speaker identification information indicating the speaker of the second sentence.

In this method, learning is performed using speaker identification information indicating a speaker of each of a plurality of sentences, and thus it is possible to accuracy in associating an uttered sentence with dialogue act information.

For example, the model may include a first model that outputs a first feature vector based on the text data of the first sentence, the text data of the second sentence, the first speaker identification information, the second speaker identification information, and a first weight parameter, a second model that outputs a second feature vector based on the text data of the first sentence, the text data of the second sentence, the first speaker change information, and a second weight parameter, and a third model that outputs a posterior probability of a dialogue act corresponding to the first sentence based on the first feature vector, the second feature vector, and a third weight parameter, wherein the learning may be performed by performing error backpropagation learning between the posterior probability and the dialogue act information indicated by the first training data.

For example, the first model may determine the first feature vector from the first sentence and the second sentence according to a first RNN-LSTM (Recurrent Neural Network-Long Short Term Memory) having the first weight parameter dependent on the first speaker identification information and the second speaker identification information, and the second model may determine the second feature vector from the first sentence and the second sentence according to a second RNN-LSTM having the second weight parameter dependent on first speaker change information.

For example, the first training data may be acquired from a corpus in which two or more pieces of training data are accumulated.

For example, the dialogue act estimation method may further include acquiring dialogue data including text data of a third sentence of a current uttered sentence uttered by a user, text data of a fourth sentence of an uttered sentence immediately previous to the third sentence, and second speaker change information indicating whether the speaker of the third sentence is the same as a speaker of the fourth sentence, and estimating a dialogue act to which the third sentence is classified by applying the dialogue data to the model based on the learning result information.

In this method, a dialogue act can be estimated from an uttered sentence using a learning result. At least one of the acquiring, the learning, and the storing may be performed by a processor.

In an aspect of the present disclosure, a dialogue act estimation apparatus, which estimates a dialogue act to which an uttered sentence is classified, includes a training data acquirer that acquires first training data indicating, in a mutually associated manner, text data of a first sentence that can be a current uttered sentence, text data of a second sentence that can be an uttered sentence immediately previous to the first sentence, first speaker change information indicating whether a speaker of the first sentence is the same as a speaker of the second sentence, and dialogue act information indicating a class of the first sentence, a learner that learns an association between the current uttered sentence and the dialogue act information by applying the first training data to a model, and a storage that stores a result of the learning as learning result information in a storage.

In this method, learning is performed using speaker change information indicating whether a speaker of a current sentence is the same as a speaker of an immediately previous sentence. This allows an increase in accuracy in associating an uttered sentence with dialogue act information. At least one of the acquisition unit, the learner, and the storage may include a processor.

In an aspect, the present disclosure provides a non-transitory storage medium storing a computer-readable program, the program causing a computer to execute the dialogue act estimation method described above.

These general or specific embodiments may be implemented as a system, a method, an integrated circuit, a computer program, or a computer-readable storage medium such as a CD-ROM disk, or as an arbitrary combination of a system, an apparatus, a method, an integrated circuit, a computer program, and a storage medium.

Embodiments of the present disclosure are described below with reference to drawings. Note that each embodiment described below is for illustrating a specific example of an implementation of the present disclosure. That is, in the following embodiments of the present disclosure, values, shapes, constituent elements, steps, the order of steps, and the like are described by way of example but not limitation, Among constituent elements described in the following embodiments, those constituent elements that are not described in independent claims indicating highest-level concepts of the present disclosure are optional. Also note that various combinations of part or all of embodiments are possible.

Embodiments

First, a configuration of a dialogue act estimation apparatus 100 according to an embodiment is described below. FIG. 1 is a block diagram illustrating the configuration of the dialogue act estimation apparatus 100 according to the present embodiment.

The dialogue act estimation apparatus 100 estimates a dialogue act to which an uttered sentence is classified. The dialogue act estimation apparatus 100 may be realized, for example, by a computer including a storage 101, a processor 102, a storage 103, a processor 104, and a storage 105.

The storages 101, 103, and 105 each may be realized using a rewritable non-volatile memory such as a hard disk drive, a solid state drive, or the like.

The storage 101 stores a training corpus 121 and dialogue data 123. The storage 103 stores learning result information 122. The storage 105 stores an estimation result 124.

The processor 102 includes a training data acquirer 111, a learner 112, and a dialogue data acquirer 113. The processor 104 includes a dialogue act estimator 114.

For example, the processors 102 and 104 each may be realized using a processor such as a CPU, ASIC, FPGA, or the like. Note that each block of the processors 102 and 104 is realized by executing, by a processor such as a CPU, a computer-readable program stored in a computer.

Figure 2:
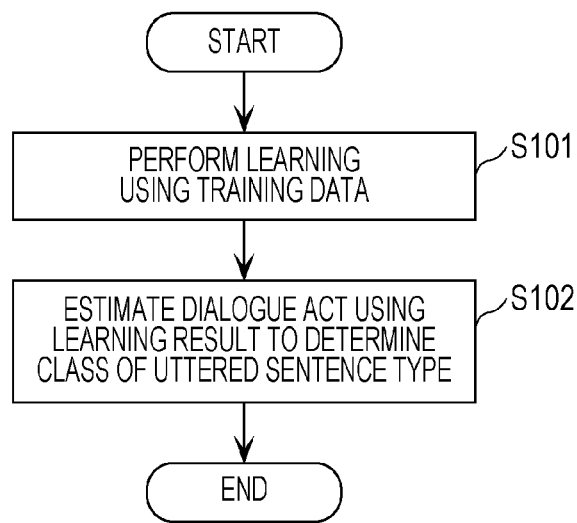
FIG. 2 is a flow chart illustrating a process performed by a dialogue act estimation apparatus according to an embodiment.

Next, an operation of the dialogue act estimation apparatus 100 is described. FIG. 2 is a flow chart illustrating an outline of the operation of the dialogue act estimation apparatus 100.

First, the dialogue act estimation apparatus 100 performs a learning process to learn a correspondence between an uttered sentence and a dialogue act using a plurality of pieces of training data included in the training corpus 121 (S101).

Next, using a result of the learning process, the dialogue act estimation apparatus 100 performs a dialogue act estimation process to estimate a dialogue act to which an uttered sentence is classified (S102).

Figure 3:
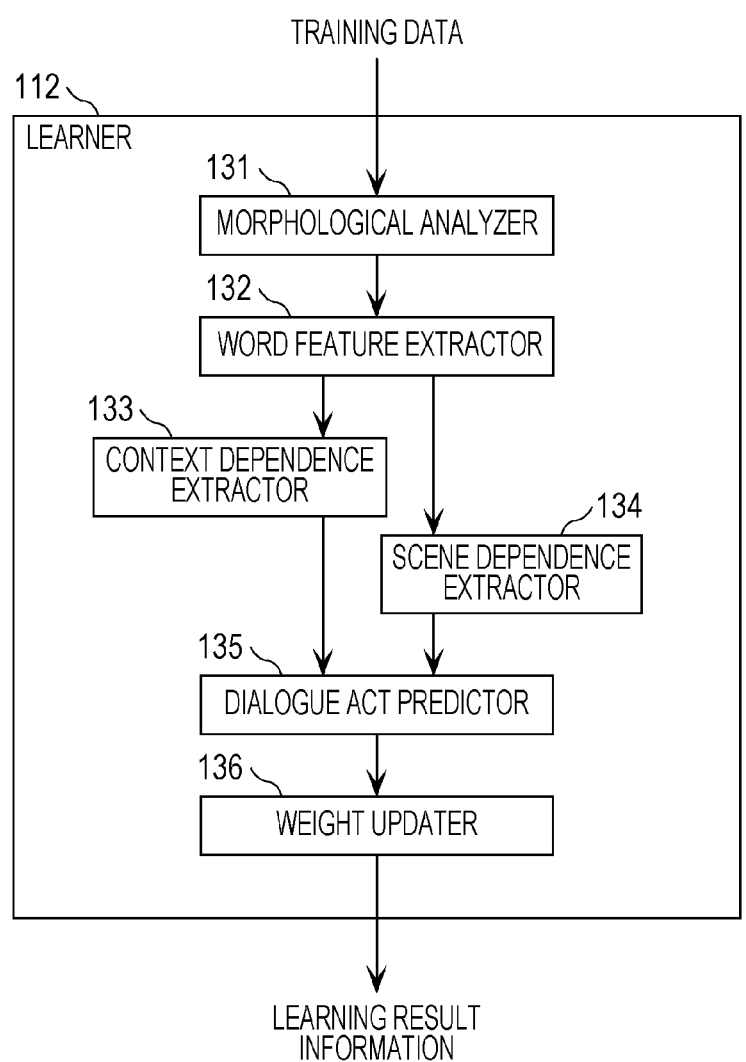
FIG. 3 is a block diagram of a learner according to an embodiment.

The learning process (S101) is described in further detail below. FIG. 3 is a block diagram illustrating a configuration of the learner 112. As shown in FIG. 3, the learner 112 includes a morphological analyzer 131, a word feature extractor 132, a context dependence extractor 133, a scene dependence extractor 134, a dialogue act predictor 135, and a weight updater 136.

FIG. 4 is a flow chart illustrating the learning process (S101) according to the present embodiment.

First, the learner 112 initializes all weight parameters to be learned based on a pseudorandom number table (S111). More specifically, the learner 112 initializes all weight parameters of a neural network model 151 described later with reference to FIG. 7.

Next, the training data acquirer 111 acquires one of a plurality pieces of training data 141 included in the training corpus 121 (S112). FIG. 5 and FIG. 6 each illustrate an example of a training corpus 121. FIG. 5 illustrates an example of a training corpus 121 of an English dialogue, while FIG. 6 illustrates an example of a training corpus 121 of a Japanese dialogue in a medical examination.

As shown in FIG. 5 and FIG. 6, the training corpus 121 includes two or more pieces of accumulated training data 141. Each training data 141 corresponds to a plurality of uttered sentences which are successively uttered in time series, and includes a plurality of pieces of training information 142 which correspond, in a one-to-one manner, to the plurality of uttered sentences. Each piece of the training information 142 includes a dialogue ID 143, time information 144, dialogue act information 145, speaker identification information 146, speaker change information 147, and a sentence 148.

The sentence 148 is text data of a sentence that can be an uttered sentence. The dialogue ID 143 is an identifier for uniquely identifying a piece of training data 141 in which a piece of training information 142 of interest is included. The time information 144 indicates a time point (an utterance order) of the sentence 148. That is, the time information 144 indicates the order in which sentences 148 in the respective pieces of training information 142 occur in one piece of training data 141. A start and an end of a dialogue in one training data 141 are managed by the dialogue ID 143 and the time information 144.

The dialogue act information 145 is training data indicating a class of the sentence 148. More specifically, as shown in FIG. 6, the dialogue act information 145 indicates a large class of a meaning of the sentence 148, such as "question", "statement-chief symptom complaint", "response-denial", "appreciation" or the like. In other words, the dialogue act information 145 indicates a meaning or a summary of the sentence 148.

The speaker identification information 146 is information for identifying a speaker of the sentence 148. The speaker change information 147 indicates whether the speaker of the current sentence 148 is the same as a speaker of an immediately previous sentence 148. For example, it is possible to calculate the speaker change information 147 from the speaker identification information 146 of the current and immediately previous sentences. For example, in a case where the speaker identification information 146 indicates that the speaker is a listener at a current time point and that the speaker is a talker at a previous time point, the speaker change information 147 is set to "response". In a case where the speaker identification information 146 indicates that the speaker is a listener at both the current time point and the previous time point, the speaker change information 147 is set to "continuous utterance". In a case where at a time a talker and a listener are opposite to those in the examples described above, the speaker identification information 146 is set to a proper value in a similar manner. That is, in a case where the speaker at the current time point is different from the speaker at the immediately previous time point, the speaker change information 147 is set to "response", while in a case where the speaker at the current time point is the same as the speaker at the immediately previous time point, the speaker change information 147 is set to "continuous utterance". In a case where there is no sentence at the previous time point, that is, in a case where the current sentence is the first sentence of all sentences included in the training data 141, the speaker change information 147 is set to "dialogue start".

The text data indicated by the sentence 148 is, for example, character string data including no word delimiter in the case of Japanese, while the text data may be character string data including a space functioning as a word delimiter in the case of English.

As described above, the training data 141 is data representing associations among the first sentence 148 that can be a current uttered sentence, the second sentence 148 that can be an uttered sentence immediately previous to the first sentence 148, the first speaker identification information 146 indicating a speaker of the first sentence 148, the second speaker identification information 146 indicating a speaker of the second sentence 148, the speaker change information 147 indicating whether the speaker of the first sentence 148 is the same as the speaker of the second sentence 148, and the dialogue act information 145 indicating a class of the first sentence 148.

The training data acquirer 111 acquires the training information 142 (the dialogue act information 145, the speaker identification information 146, the speaker change information 147, the sentence 148) at the current time point (time of the training information 142 to be processed), and one or more pieces of the speaker identification information 146 and sentences 148 within a continuous time range immediately previous to the current time point wherein the time range is represented by a context window size (this time range is also referred to as a set of previous time points).

The dialogue act estimation apparatus 100 performs the process in step S112 repeatedly while changing the current time point of the training information 142 to be processed or changing the training data 141 until the learning converges. In this process, the training data acquirer 111 performs the extraction based on dialogue IDs 143 such that there is a discontinuation between different dialogues. Each time the extraction is performed, the training data acquirer 111 increments the current time point to extract different learning data. In a usual case, the context window size is fixed.

However, in a case where context information is so small that the context window size is not filled with context information as in the initial dialogue state, the context window size is set to be smaller than in the usual case.

For example, in the example shown in FIG. 5, in a case where the context window size is 5 and the sentence 148 at a time point 5 is a sentence to be processed, then the following data/information is acquired: the sentence 148 at the current time point 5; the sentence 148 at time points 0 to 4 in the set of previous time points; the speaker identification information 146 "B, A, A, A, A, B" at the current time point and the set of previous time points, 0 to 5; and the speaker change information 147 "response" at the current time point 5. Furthermore, dialogue act information 145 "uninterpretable" at the time point 5 is acquired as training data indicating a correct value in the learning.

Similarly, in the example shown in FIG. 6, in a case where the context window size is 5 and the sentence 148 at the time point 5 is a sentence to be processed, then the following data/information is acquired: the sentence 148 at the current time point 5; the sentence 148 at time points 0 to 4 in the set of previous time points; the speaker identification information 146 "B, A, B, A, B, B" at the current time point and the set of previous time points, 0 to 5; the speaker change information 147 "continuous utterance" at the current time point 5; and the dialogue act information 145 "question" at the time point 5.

Next, the learner 112 learns the association between the current uttered sentence (sentence 148) and the dialogue act information 145 by applying the acquired training data 141 to a particular model, taking into account importance levels of words included in the current uttered sentence (sentence 148). Herein, the model is, for example, a neural network model 151 which will be described later.

More specifically, the morphological analyzer 131 divides each of the sentences 148 at the current time point and at time points in the set of previous time points acquired by the training data acquirer 111 into words thereby converting each sentence 148 to a word sequence (S113). For example, in the case of Japanese, this process may be performed using morphological analysis software (for example, MeCab). In the case of English, the process may be performed by regarding spaces in each utterance as word delimiters. For example, when a given sentence is "I have a headache.", the morphological analyzer 131 divides the given sentence into "I", "have", "a", "headache", and ".".

Next, the word feature extractor 132 converts each of the word sequences obtained by the morphological analyzer 131 for the current time point and time points in the set of previous time points to a feature vector, which is a sentence vector representation representing a word feature (S114). A specific method usable herein is, for example, to convert each sentence to a feature vector based on a list of all words having a possibility of being input (hereinafter, this list will also be referred to as a dictionary) such that the feature vector has a value of 1 for only elements corresponding to words or successive words included in the sentence. This method is known as a bag of words expression. That is, the feature vector includes as many elements as the total number of words or successive words included in the list, and each element corresponds to a word or successive words.

Supervised learning (in which, for example, a dialogue act is employed as training data) may be performed as well as prior or post learning to extract a word which occurs frequently in a particular dialogue act and convert the extracted word to a vector representation.

Next, the context dependence extractor 133 determines a first feature vector indicating a context, which is frequently used in predicting a dialogue act corresponding to the sentence at the current time point, based on feature vectors at time points in the set of previous time points, a feature vector at the current time point, speaker identification information 146 at time points in the previous set of time points and speaker identification information 146 at the current time point, and a first weight parameter (S115). For example, this function is realized by a model 153 (a first model) shown in FIG. 7. The model 153 outputs a first feature vector based on the text data of the first sentence 148 at the current time point, the text data of the second sentence 148 at time points in the set of previous time points, the first speaker identification information 146 at the current time point, the second speaker identification information 146 at time points in the set of previous time points, and a first weight parameter. For example, the model 153 determines the first feature vector from the first sentence at the current time point and the second sentence at time points in the set of previous time points according to a RNN-LSTM (Recurrent Neural Network-Long Short Term Memory) which is a time series neural network model having a first weight parameter dependent on speaker identification information 146 at time points in the set of previous time points (previous speaker identification information) and speaker identification information 146 at the current time point (current speaker identification information). By this model 153, context information dependent on the current sentence with a high occurrence frequency is finally output as the first feature vector from the hidden layer.

The scene dependence extractor 134 calculates a second feature vector indicating sentences at the current time point and at the immediately previous time point for each scene (dialogue start, continuous utterance, response, and the like) used frequently in predicting a dialogue act corresponding to the sentence at the current time point, based on the feature vector at the current time point, a feature vector at the time point immediately previous to the current time point (hereinafter also referred to as the immediately previous time point), the speaker change information 147 at the current time point, and the second weight parameter (S116). For example, this function is realized by a model 152 (a second model) shown in FIG. 7. That is, the second model 152 outputs the second feature vector based on the text data of the first sentence 148 at the current time point, the text data of the second sentence 148 at the immediately previous time point, the first speaker change information 147 at the current time point, and the second weight parameter. For example, the model 152 determines the second feature vector from the first sentence at the current time point and the second sentence at the immediately previous time point according to RNN-LSTM, which is a time series neural network model, having a parameter depending on the speaker change information 147 at the current time point. By this model 152, the second feature vector indicating sentences at the current time point and the immediately previous time point which frequently occur is output for each scene finally from a hidden layer.

Next, the dialogue act predictor 135 calculates a posterior probability indicating a probability distribution of a dialogue act corresponding to the sentence at the current time point depending on the first feature vector, the second feature vector, and the third weight parameter (S117). For example, as in the model 154 shown in FIG. 7, this function is realized by multinomial logistic regression. That is, the third model 154 outputs the posterior probability of the dialogue act corresponding to the first sentence at the current time point based on the first feature vector, the second feature vector, and the third weight parameter.

Next, the weight updater 136 updates first to third weight parameters of the models 152 to 154 based on the posterior probability of the dialogue act and the dialogue act at the current time point which is a true value indicated by the dialogue act information 145 (S118). For example, the weight updater 136 updates the weight parameter by using an error backpropagation method based on a prediction error between the posterior probability and the true value of the dialogue act. That is, the weight updater 136 learns updating the first to third weight parameters such that the error (the difference) between the posterior probability and the true value of the dialogue act. As described above, in the learning, the learner 112 performs error backpropagation between the posterior probability and the dialogue act information 145 indicated by the training data 141 at the current time point.

Next, the learner 112 determines whether the learning process is to be ended (S119), For example, the learner 112 makes the determination such that in a case where the repetition of learning does not result in a further reduction in the error, the learner 112 determines that the learning process is to be ended.

In a case where it is determined that the learning process is not to be ended (No in S119), the process is performed again from step S112 for the next time point or for another training data 141. In a case where it is determined that the learning process is to be ended (Yes in S119), the learning result information 122 indicating a result of the learning process is stored in the storage 103 (S120). More specifically, this learning result information 122 indicates learning parameters (first to third Weight parameters) as of when the learning process is ended.

Figure 7:
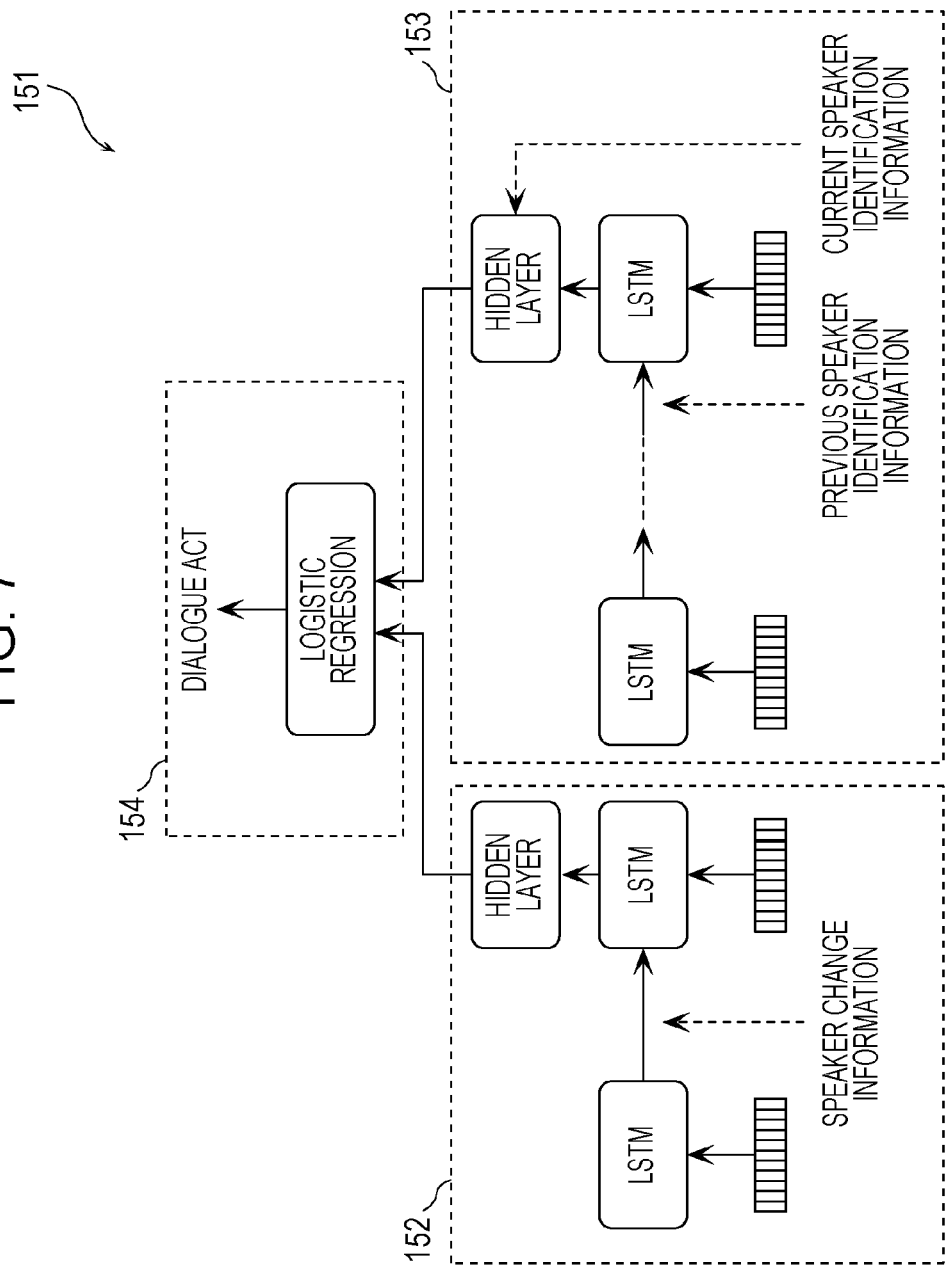
FIG. 7 is a diagram illustrating an outline of a neural network according to an embodiment.

The learning process using the neural network model 151 is described in further detail below. FIG. 7 is a diagram illustrating an outline of the neural network model 151 used in the context dependence extractor 133, the scene dependence extractor 134, and the dialogue act predictor 135 according to the present embodiment. The model 151 includes models 152 to 154 described above.

The model 153 used in the context dependence extractor 133 includes a recurrent neural network (RNN-LSTM) and a hidden layer.

The recurrent neural network is suitable for use in processing time-series data. Among various types of recurrent neural networks, the LSTM (Long Short Term Memory) has an advantageous feature that it becomes possible to learn a long-term dependency by providing a module called a storage unit.

Similarly, the model 154 used in the scene dependence extractor 134 includes a recurrent neural network (LSTM) and a hidden layer. The model 154 used in the dialogue act predictor 135 is configured to perform logistic regression.

The neural network model 151 is used to minimize a cross-entropy error represented by formula (1) shown below.

$$L = \sum_{t=1}^{N} \sum_{k=1}^{K} -u_{tk} \log P(Y = y_{tk} \mid x_{t-T} \ldots x_t; \theta) \quad (1)$$

In formula (1), $P(Y=y_{tk}|x_{t-T}, \ldots x_t;)$ indicates a posterior probability of a k-th dialogue act $y_{tk}$ of K dialogue acts for a feature vector $x_t$ of a t-th sentence 148 (at the current time point) and feature vectors $x_{t-T}$ at time points of the set of previous time points in N pieces of training information 142. T denotes a fixed context window size indicating the number of time points included in the set of previous time points. θ denotes all learning parameters of the neural network, and $u_{tk}$ denotes a true value of a dialogue act for a t-th uttered sentence. That is, formula (1) indicates a prediction error of a dialogue act for all data. The learner 112 updates θ using the error backpropagation method to minimize the prediction error represented in formula (1).

A flow of a process performed in the neural network to determine each posterior probability is described below. First, in the LSTM, as described in formula (2) to formula (5) shown below, the feature vector x is multiplied by four weight matrices $W^i$, $W^c$, $W^f$, and $W^o$, $h_{t-1}$ indicating a previous output from the LSTM is multiplied by weight matrices $H^i$, $H^c$, $H^f$, and $H^o$, and respective results thereof are added with bias terms $b^i$, $b^c$, $b^f$, and $b^o$. By putting these results as arguments in a sigmoid function, which is an activation function, four vectors $i_t$, $c\sim_t$, $f_t$, and $o_t$ having element values in a range from 0 to 1 are calculated. The vectors $i_t$, $c\sim_t$, $f_t$, and $o_t$ are for controlling the storage unit, and more specifically, the vectors $i_t$, $c\sim_t$, $f_t$, and $o_t$ respectively assume responsibility for storage input control, input memory cells, forgetting control, and storage output control.

$$i_t = \sigma(W^i x_t + H^i h_{t-1} + b^i) \quad (2)$$

$$\tilde{c}_t = \sigma(W^c x_t + H^c h_{t-1} + b^c) \quad (3)$$

$$f_t = \sigma(W^f x_t + H^f h_{t-1} + b^f) \quad (4)$$

$$o_t = \sigma(W^o x_t + H^o h_{t-1} + b^o) \quad (5)$$

Next, as shown below in formula (6), the learner 112 updates a value of a memory cell $c_t$ of the neural network based on an input control vector $i_t$, an input memory cell $c\sim_t$, a forget control vector $f_t$, and a previous memory unit value $c_{t-1}$.

$$c_t = i_t * \tilde{c}_t + f_t * c_{t-1} \quad (6)$$

Next, the learner 112 calculates $h_t$ indicating a current output from the LSTM using the output control vector $o_t$ and the memory cell $c_t$ according to formula (7).

$$h_t = o_t * \tanh(c_t) \quad (7)$$

In formula (7), t indicates a time point of a sentence as counted in sentences arranged in a time series starting from a past time point, and more particularly, t denotes the number of time points existing before the current sentence. Formula (8) represents a tanh function.

$$\tanh(a) = \frac{e^x - e^{-x}}{e^x + e^{-x}} \quad (8)$$

The learner 112 performs the operation recursively until t=e is reached, that is, until the current time point of the dialogue act to be predicted is reached. Note that weight parameters used in the process described above are different between the context dependence extractor 133 and the scene dependence extractor 134.

In particular, in the present embodiment, as shown below in formula (9), in the model 153 shown in FIG. 7, variables $Hi_{at-1}$, $Hc_{at-1}$, $Hf_{at-1}$, and $Ho_{at-1}$ depending on previous speaker identification information are used in weight matrices $H^i$, $H^c$, $H^f$, and $H^o$ in formula (2) to formula (6). That is, a feature vector of a sentence of a previous speaker is calculated using weight parameters which are different depending on an identification number of the speaker, and the resultant feature vector is recursively added to a feature vector of a sentence of a next speaker. As a result, the speaker is distinguished in terms of whether the speaker is a talker or a listener, and a context is reflected in the output of the LSTM at the current time point at which the dialogue act is predicted.

$$H^{i,f,c,o} = H_{a^{t-1}}^{i,f,c,o} \quad (9)$$

In the model 152 shown in FIG. 7, variables $Hi_{st-1}$, $Hc_{st-1}$, $Hf_{st-1}$, and $Ho_{st-1}$ depending on the speaker change information 147 are used for weight matrices $H^i$, $H^c$, $H^f$, and $H^o$ in formula (2) to formula (6) as shown below in formula (10).

$$H^{i,f,c,o} = H_s^{i,f,c,o} \quad (10)$$

That is, a feature vector of a sentence of a previous speaker is calculated using weight parameters varying depending on a scene (dialogue start, a continuous utterance, a response, or the like), and the resultant feature vector is recursively added to a feature vector of a sentence of a next speaker. The scene dependence extractor 134, unlike the context dependence extractor 133, uses only two successive sentences, that is, a current sentence and an immediately previous sentence, and the scene dependence extractor 134 is insensitive to a speaker. Thus, a dialogue act that often occurs in a scene regardless of speakers is reflected, and context information over a long-term range is not reflected.

Next, in a hidden layer in the model 153 shown in FIG. 7, according to formula (11) shown below, $hl_e$ at a time point t=e of the current sentence to be predicted in terms of the dialogue act is multiplied by a weight matrix $Ol_{ae}$ dependent on the speaker identification information, and the result is added with a bias term $b^l$ thereby obtaining a first feature vector $f_{l-dep}$.

$$f_{r-dep} = O^r h_e^r + b^r \quad (11)$$

Similarly, in a hidden layer in the model 152 shown in FIG. 7, according to formula (12) shown below, $hr_e$ at the time point t=e of the current sentence to be predicted in terms of the dialogue act is multiplied by a weight matrix $O^r$, and the result is added with a bias term $b^r$ thereby obtaining a second feature vector $f_{r-dep}$.

$$f_{l-dep} = O_a^l h_c^l + b^l \quad (12)$$

Finally, in the logistic regression in the model 154 shown in FIG. 7, as shown below in formula (13), the first feature vector $f_{l-dep}$ and the second feature vector $f_{r-dep}$, determined according to formula (11) and formula (12) are combined, and the result is multiplied by a weight matrix $O^{class}$ and the result thereof is added with a bias term $b^{class}$. Furthermore, each obtained element is put as an argument in a softmax function shown below in formula (14). As a result, a probability distribution of a dialogue act is obtained. Each element in the probability distribution indicates a posterior probability $P(Y=y_{tk}|x_{t-T}, \ldots x_t; \theta)$.

$$P(Y = y_{tk} | x_{t-T} \ldots x_t; \theta) = softmax(O^{class}[f_{l-dep}; f_{r-dep}] + b^{class}) \quad (13)$$

$$softmax(a_k) = \frac{e^{a_k}}{\sum_{i=0}^{K} e^{a_i}} \quad (14)$$

Note that formula (11) to formula (13) provide a method of realizing in a neural network an approximation function for obtaining a probability distribution from a vector indicating a feature value.

In the manner described above, the posterior probability of the dialogue act is calculated by the neural network model 151 shown in FIG. 7.

Figure 8:
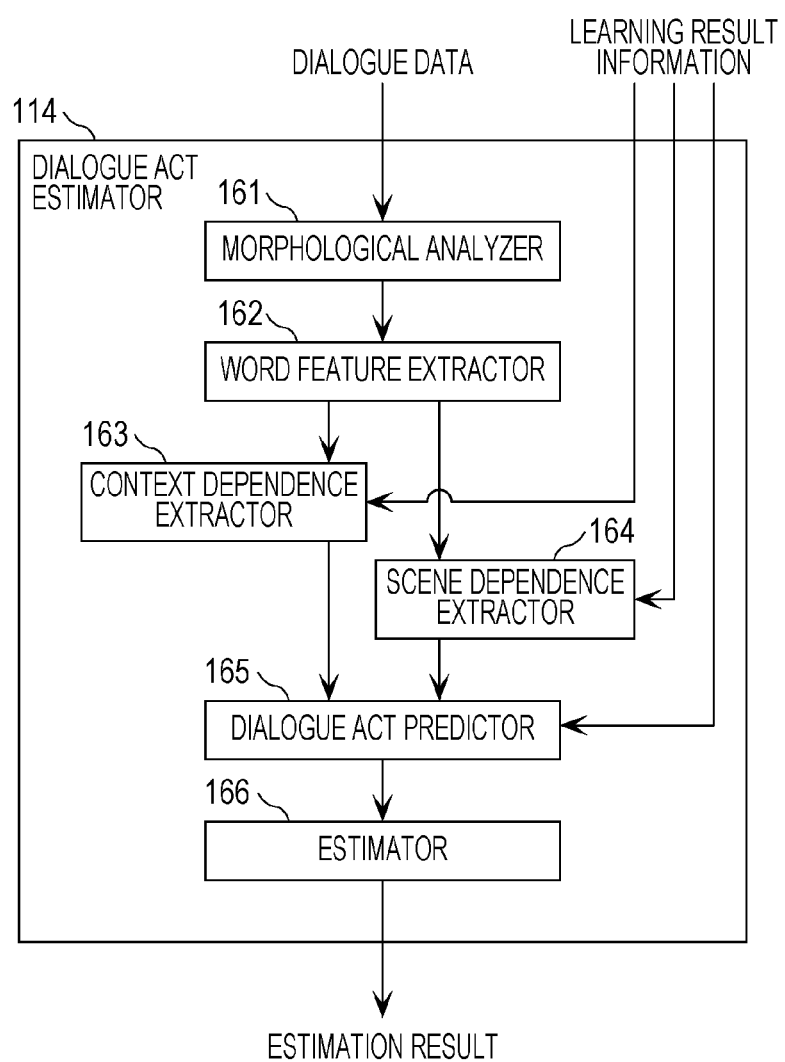
FIG. 8 is a block diagram of a dialogue act estimator according to an embodiment.

Next, the dialogue act estimation process (S102 in FIG. 2) performed using the learning result obtained via the learning process is described in further detail below. FIG. 8 is a block diagram illustrating a configuration of the dialogue act estimator 114.

The dialogue act estimator 114 includes a morphological analyzer 161, a word feature extractor 162, a context dependence extractor 163, a scene dependence extractor 164, a dialogue act predictor 165, and an estimator 166.

Figure 9:
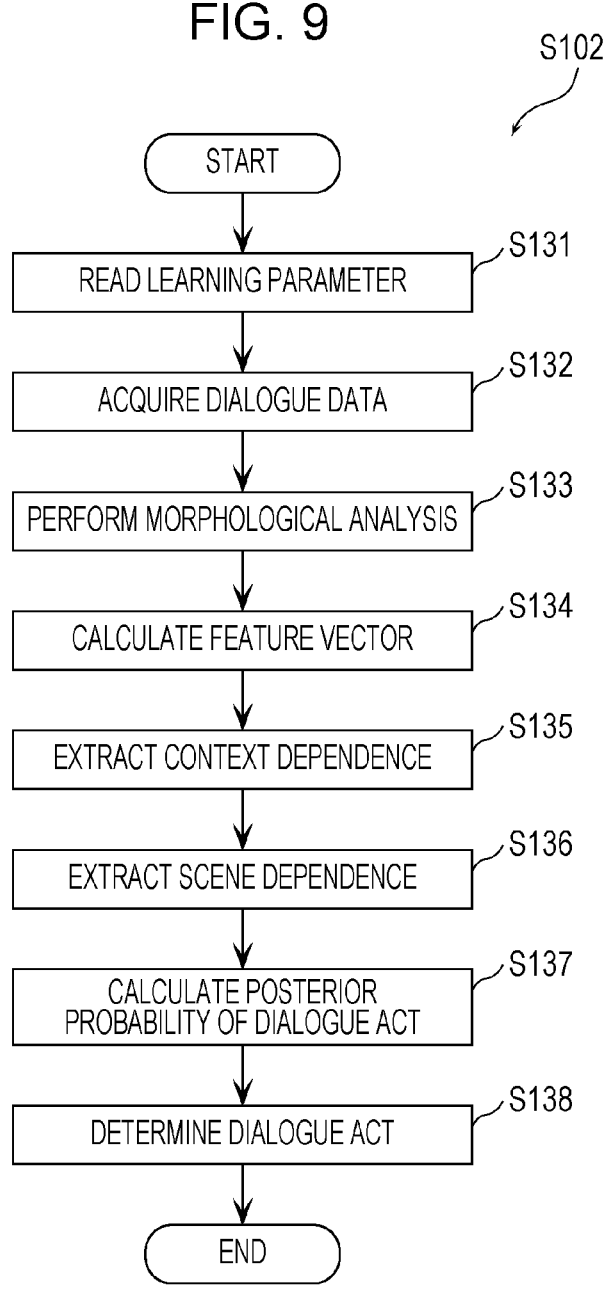
FIG. 9 is a flow chart illustrating a dialogue act estimation process according to an embodiment.

FIG. 9 is a flow chart illustrating the dialogue act estimation process (S102) according to the present embodiment.

First, the context dependence extractor 163, the scene dependence extractor 164, and the dialogue act predictor 165 read learning result information 122 (first to third weight parameters) stored, in the learning process (S101), in the storage 103 (S131). More specifically, the first to third weight parameters of the neural network model 151 shown in FIG. 7 are updated.

Figure 10:
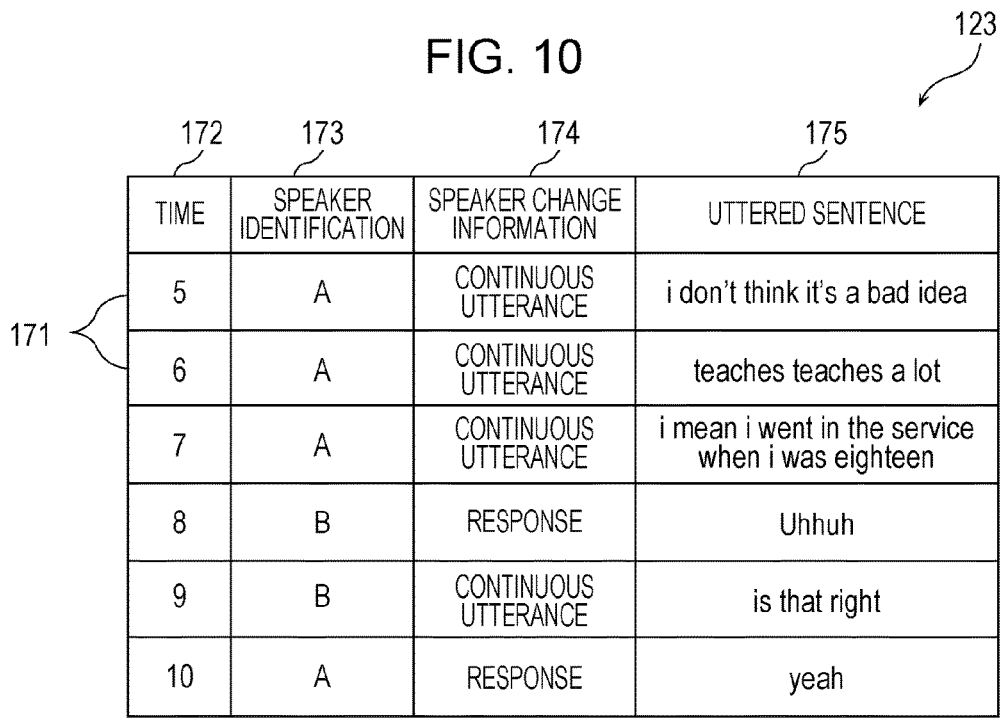
FIG. 10 is a diagram illustrating an example of dialogue data according to an embodiment.
Figure 11:
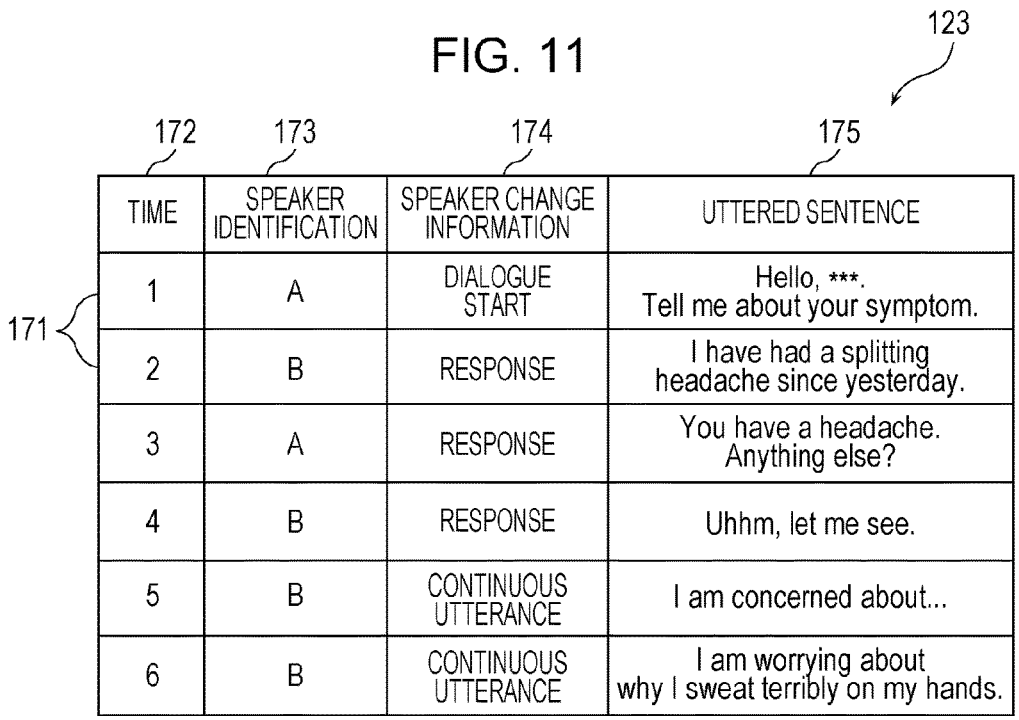
FIG. 11 is a diagram illustrating an example of dialogue data according to an embodiment.

Next, the dialogue data acquirer 113 acquires dialogue data 123 stored in the storage 101 (S132). FIG. 10 and FIG. 11 each illustrate an example of dialogue data 123. More specifically, FIG. 10 illustrates an example of dialogue data 123 for a case where a dialogue is performed in English, and FIG. 10 illustrates an example of dialogue data 123 for a case where a dialogue in a medical examination is performed in Japanese.

As shown in FIG. 10 and FIG. 11, the dialogue data 123 includes a plurality of pieces of dialogue information 171 corresponding to a plurality of uttered sentences uttered in a time series order. Each dialogue information 171 includes time information 172, speaker identification information 173, speaker change information 174, and an uttered sentence 175.

The uttered sentence 175 is text data of a sentence uttered by a user. Note that the time information 172, the speaker identification information 173, and the speaker change information 174 are respectively similar to the time information 144, the speaker identification information 146 and the speaker change information 147 included in the training corpus 121 described above.

As described above, the dialogue data 123 includes text data of a third sentence, which is a current uttered sentence 175 uttered by a user, text data of a fourth sentence, which is an uttered sentence 175 immediately previous to the third sentence, third speaker identification information 173 indicating a speaker of the third sentence, fourth speaker identification information 173 indicating a speaker of the fourth sentence, and second speaker change information 174 indicating whether the speaker of the third sentence is the same as the speaker of the fourth sentence.

The dialogue data 123 is generated, for example, based on a plurality of successive uttered sentences input from the outside. More specifically, first, the dialogue act estimation apparatus 100 divides the input successive uttered sentences into a time series of sentences thereby obtaining the plurality of uttered sentences 175. Next, the dialogue act estimation apparatus 100 adds time information 172 and speaker identification information 173 to each uttered sentence 175. The dialogue act estimation apparatus 100 calculates the speaker change information 174 based on the speaker identification information 173. More specifically, the dialogue act estimation apparatus 100 calculates the speaker change information 174 at the current time point based on the speaker identification information 173 at the present time and the speaker identification information at the immediately previous time point, and adds the resultant speaker change information 174 to the uttered sentence 175 at the current time point.

In this process, dividing the successive uttered sentences into a time series of sentences is performed such that, for example, in a case where the uttered sentences are input by a text chat system, the dividing is performed in units of text transmitted at a time to a person whom the uttered sentences are directed to. On the other hand, in a case where inputting is performed using a voice dialogue system, the uttered sentences are divided based on occurrences of continuous inactive voice segments that trigger speech recognition. The speaker identification information 173 may be generated using voiceprinting recognition or the like, or may be input from the outside.

As for the dialogue data 123, at least, successive past uttered sentences dependent on the context window size and a newly input current uttered sentence are held. An oldest past uttered sentence is discarded depending on a new input. As for the context window size, the same value as that used in the above-described learning process (S101) is used.

Next, the dialogue act estimator 114 applies the dialogue data 123 to the model 151 based on the learning result information 122 thereby estimating a dialogue act to which the third sentence at the current time point is classified.

More specifically, the morphological analyzer 161 divides, into words based on morphological analysis, each of the uttered sentences 175 at the current time point and times points in the set of previous time points included in the acquired dialogue data 123 thereby obtaining a word string (S133).

Next, the word feature extractor 162 the word string at the current time point and word strings at time points in the set of previous time points obtained by the morphological analyzer 161 are respectively converted to feature vectors which are sentence vector representations representing word features (S134). The details of steps S133 and S134 are similar to those of steps S113 and S114 described above.

Next, the context dependence extractor 163 determines a first feature vector based on the feature vectors at time points of the set of previous time points the feature vector at the current time point, the speaker identification information 173 at times of the set of previous time points and at the current time point, and the first weight parameter (S135).

The scene dependence extractor 164 calculates a second feature vector based on the feature vector at the current time point, the feature vector at the immediately previous time point, the speaker change information 174 at the current time point, and the second weight parameter (S136).

The dialogue act predictor 165 calculates a posterior probability indicating a probability distribution of a dialogue act corresponding to the sentence at the current time point based on the first feature vector, the second feature vector, and the third weight parameter (S137).

The detailed process in steps S135 to S137 are similar to that in steps S115 to S117 except that the first to third parameters indicated by the learning result information 122 are used.

Next, the estimator 166 estimates a dialogue act based on the posterior probability of the dialogue act obtained in step S137, and stores an estimation result 124 indicating the estimated dialogue act in the storage 105 (S138). For example, the estimator 166 employs, as an estimation result 124, a dialogue act having a highest probability value among probability values of a plurality of dialogue acts indicated by posterior probabilities.

Furthermore, the process shown in FIG. 9 is performed sequentially for the respective uttered sentences at each time point.

FIG. 12 and FIG. 13 each illustrate an example of an estimation result 124. FIG. 12 illustrates an example of an estimation result 124 for a case where a dialogue is performed in English, and FIG. 13 illustrates an example of an estimation result 124 for a case where a dialogue in a medical examination is performed in Japanese. As shown in FIG. 12 and FIG. 13, the estimation result 124 includes a plurality of pieces of estimation result information 181 corresponding to a plurality of uttered sentences uttered in a time series order. Each estimation result information 181 includes time information 172, speaker identification information 173, speaker change information 174, an uttered sentence 175, and a predicted dialogue act 182.

The predicted dialogue act 182 indicates an estimation result of a dialogue act obtained by the estimator 166. Note that the time information 172, the speaker identification information 173, the speaker change information 174 and the uttered sentence 175 are the same as those included in the dialogue data 123.

In the example shown in FIG. 12, when the context window size is 5, the uttered sentences 175 at time points in the set of previous time points are uttered sentences 175 at time points 5 to 9, and the uttered sentence 175 at the current time point is an uttered sentence 175 at a time point 10. A plurality pieces of speaker identification information 173 at the respective time points are "A, A, A, B, B, A", and speaker change information 174 at the current time point is "response", In this case, "Yes answers" is obtained as the predicted dialogue act 182 corresponding to the current time point. This is an example in which a still enhanced prediction probability is achieved by extracting, by the scene dependence extractor 164, "is that right" in a current utterance and a previous utterance as a frequently occurring utterance dependent on the scene.

In the example shown in FIG. 13, when the context window size is 5, the uttered sentences 175 at time points in the set of previous time points are uttered sentences 175 at time points 1 to 5, and the uttered sentence 175 at the current time point is an uttered sentence 175 at a time point 6. A plurality pieces of speaker identification information 173 corresponding to the respective time points are "A, B, A, B, B, B", and speaker change information 174 corresponding to the current time point is "continuous utterance". In this case, "response-chief symptom complaint" is obtained as the predicted dialogue act 182 corresponding to the current time point. This is an example in which a still enhanced prediction probability is achieved by extracting, by the scene dependence extractor 164, "I am concerned about . . . " in an immediately previous utterance as a frequently occurring utterance dependent on the scene, and furthermore by extracting, by the context dependence extractor 163, "You have a headache. Anything else?" in a current utterance as context information indicating a frequently occurring context depending on the current utterance.

Figure 14:
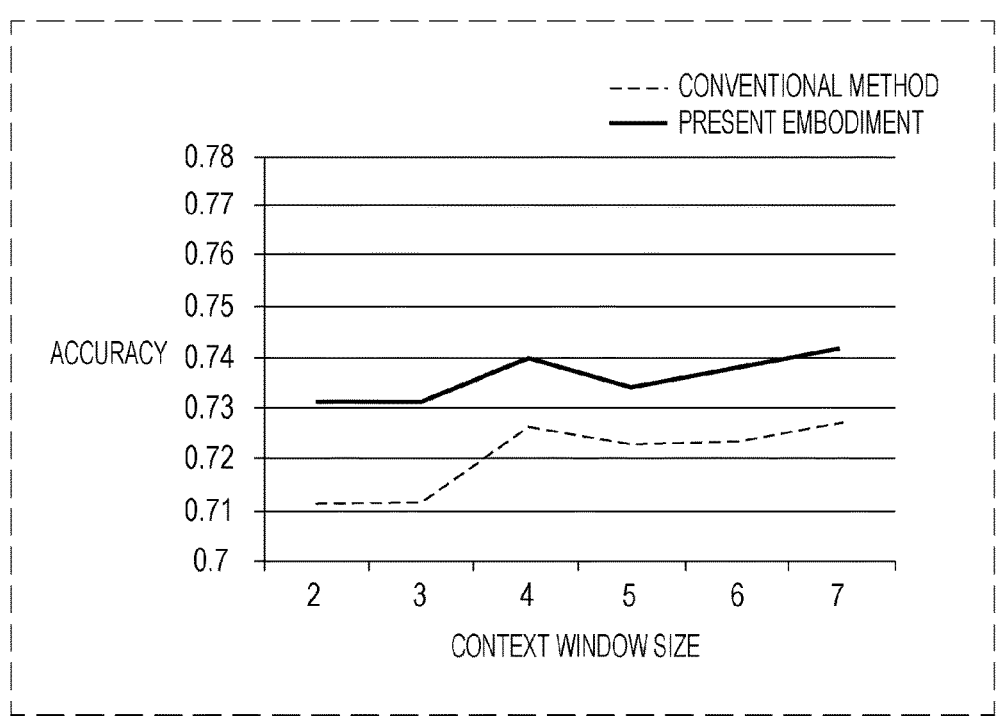
FIG. 14 is a diagram illustrating accuracy of an estimation result according to an embodiment.

FIG. 14 is a diagram illustrating a learning result using 200 dialogue act corpuses of English dialogues according to the present embodiment. In classification accuracy into 42 classes of dialogue acts, the method according to the present embodiment is better for various context window sizes than is achieved by the conventional technique disclosed in Nal Kalchbrenner, Phil Blunsom, "Recurrent Convolutional Neural Networks for Discourse Compositionality", arXiv preprint arXiv: 1306.3584, 2013. In particular, in a case where the number of dialogue act corpuses is small, it is possible to improve the performance of converting general dialogue acts by taking into account two successively utterances that are not low in occurrence frequency compared to the case in which context information of past utterances older than the immediately previous utterance is learned.

In the example described above, the training corpus 121 includes a plurality of pieces of training data 141. However, the training corpus 121 may include only one piece of training data 141.

Furthermore, in the example described above, the learning process and the dialogue act estimation process are both performed by the dialogue act estimation apparatus 100. However, these two processes may be performed by different apparatuses.

As described above, the dialogue act estimation apparatus 100 according to the present embodiment performs the learning using the speaker change information 147 indicating whether the speaker of the current sentence is the same as the speaker of the immediately previous sentence, and the speaker identification information 146 indicating the speaker of each sentence. This results in an increase in accuracy in associating an uttered sentence with dialogue act information.

Figure 15:
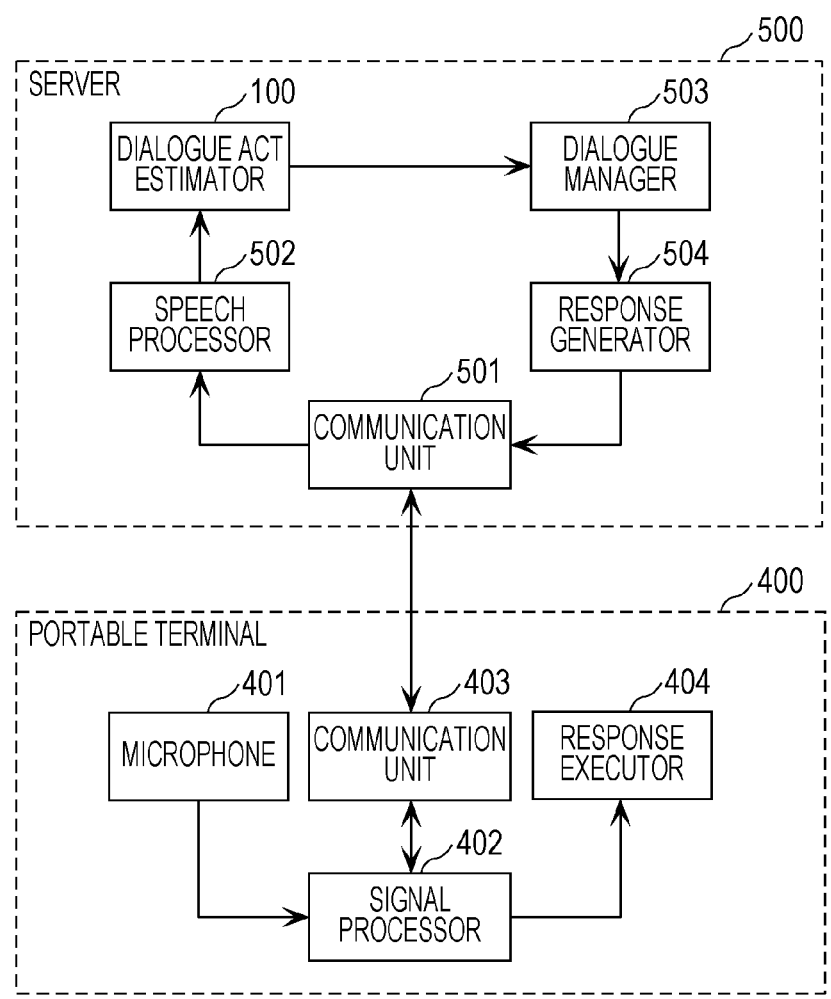
FIG. 15 is a block diagram stating a dialogue system according to an embodiment.

A manner of using the dialogue act estimation apparatus 100 is described below. FIG. 15 is a block diagram illustrating a dialogue system including the dialogue act estimation apparatus 100. This dialogue system has a speech recognition capability, and includes a server 500 located on a cloud and a portable terminal 400. A user is allowed to make a voice dialogue in a natural language with the system via the portable terminal 400.

The portable terminal 400 and the server 500 are connected to each other, for example, via a public communication network such as the Internet. The portable terminal 400 may be a smartphone, a tablet, or the like.

The portable terminal 400 includes a microphone 401, a signal processor 402, a communication unit 403, and a response executor 404. The microphone 401 is a unit that converts a voice to an electric voice signal and is used to collect a voice of a user.

The signal processor 402 determines whether a voice input from the microphone 401 is noise or not. In a case where the voice signal is not noise, the signal processor 402 outputs the voice signal to the communication unit 403.

The communication unit 403 converts the input voice signal to a communication signal in a format so as to be allowed to be transmitted, and transmits the resultant communication signal to the server 500.

The response executor 404 displays, on a monitor, a response sentence received by the signal processor 402 from the communication unit 403.

The server 500 includes a dialogue act estimation apparatus 100, a communication unit 501, a speech processor 502, a dialogue manager 503, and a response generator 504. The communication unit 501 receives a communication signal from the portable terminal 400, extracts a voice signal from the communication signal, and outputs the extracted voice signal to the speech processor 502.

The speech processor 502 analyzes the extracted voice signal and generates text data indicating a voice uttered by a user.

The dialogue act estimation apparatus 100 is, for example, the dialogue act estimation apparatus 100 shown in FIG. 1 and is in a state in which the learning process described above is already completed. The dialogue act estimation apparatus 100 generates the dialogue data 123 described above using text data generated by the speech processor 502, estimates a dialogue act using the dialogue data 123, and outputs an estimation result.

The dialogue manager 503 holds, in a time-serial manner, dialogue acts estimated by the dialogue act estimation apparatus 100, and outputs a dialogue act of a response on the system side based on the series of dialogue acts.

The response generator 504 generates a response sentence corresponding to the dialogue act received from the dialogue manager 503. The communication unit 501 converts the generated response sentence to a format capable of being transmitted, and transmits the resultant communication signal to the portable terminal 400.

In the dialogue system shown in FIG. 15, as described above, the server 500 is capable of correctly understanding an utterance of a user using the dialogue act estimation apparatus 100 in the state in which the learning is completed, and is capable of responding correctly.

The dialogue act estimation apparatus has been described above with reference to the specific embodiments. However, the present disclosure is not limited to the embodiments described above.

Each of the processors in the dialogue act estimation apparatus according to any one of the embodiments described above may be typically implemented by an integrated circuit such as an LSI. The LSI may be individually formed as chips, or one chip may be formed so as to include a part or all of the processors.

However, the technique of implementing an integrated circuit is not limited to the LSI and may be realized by using a dedicated circuit or a general-purpose processor. An FPGA (Field Programmable Gate Array) that can be programmed after the manufacture of the LSI or a reconfigurable processor in which the connections and the settings of circuit cells disposed inside the LSI can be reconfigured may be used.

The present disclosure may be implemented as a dialogue act estimation method executed by a dialogue act estimation apparatus.

In each embodiment described above, each constituent element may be realized using dedicated hardware or may be realized by executing software program corresponding to the constituent element. Each constituent element may be realized by a program execution unit such as a CPU, a process or the like by reading software program stored in a storage medium such a hard disk, a semiconductor memory, or the like and executing the software program.

Note that the manners of dividing the meaning generation apparatus into functional blocks shown in block diagrams are merely examples. A plurality of functional blocks may be combined together into one functional block, or one functional block may be divided into a plurality of functional block. A part of function may be transferred to another functional block. Functions of a plurality of functional blocks having similar functions may be executed by single hardware or may be executed by software in parallel or in a time-sharing manner.

The orders of executing the steps described in flow charts are merely examples that may be employed to realize the present disclosure, and the order may be different from those employed in these examples. Part of the steps may be performed concurrently (in parallel) with other steps.

The dialogue act estimation apparatus has been described above according to one or more aspect with respect to the embodiments. However, the present disclosure is not limited to the embodiments described above. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

The present disclosure is applicable, for example, to a dialogue act estimation apparatus and a system that properly understands an utterance of a user based on a stored dialogue history of utterances in the form of a voice or text uttered by a user. For example, the present disclosure is usable in a call center to achieve a task of a user, or a task-oriented or non-task-oriented dialogue apparatus or a dialogue system in which an inquiry dialogue, a chat, or the like is performed. The present disclosure is usable in an information search apparatus or an information search system in which only a particular dialogue act is extracted from a dialogue history.

What is claimed is:

1. A dialogue act estimation method, in a dialogue act estimation system, comprising:
   acquiring sounds by a microphone in a terminal;
   determining, by a processor in the terminal, whether the acquired sounds are uttered sentences of one or more speakers or noise;
   outputting the uttered sentences to communication transmitter only when the processor determines that the acquired sounds are uttered sentences of the one or more speakers and are not noise;
   converting the uttered sentences of the one or more speakers to one or more formatted communication signals when the processor determines that the acquired sounds are uttered sentences of the one or more speakers;
   transmitting the one or more formatted communication signals from the terminal over a communication network to a server;
   receiving the one or more formatted communication signals by the server;
   converting the received one or more formatted communication signals by a processor in the server to the uttered sentences of the one or more speakers;
   acquiring first training data by the server from the converted uttered sentences of the one or more speakers indicating, in a mutually associated manner, text data of a first sentence that can be a current uttered sentence, text data of a second sentence that can be an uttered sentence immediately previous to the first sentence, first speaker change information indicating whether a speaker of the first sentence is the same as a speaker of the second sentence, and dialogue act information indicating a class of the first sentence;
   learning an association between the current uttered sentence and the dialogue act information by applying the first training data to a model;
   storing a result of the learning as learning result information in a memory in the server;
   acquiring dialogue data including text data of a third sentence of a current uttered sentence uttered by a user, text data of a fourth sentence of an uttered sentence immediately previous to the third sentence, and second speaker change information indicating whether the speaker of the third sentence is the same as a speaker of the fourth sentence;
   estimating a dialogue act to which the third sentence is classified by applying the dialogue data to the model based on the learning result information; and generating a correct response to the uttered sentences of the one or more speakers,
wherein the model includes
a first model that outputs a first feature vector based on the text data of the first sentence, the text data of the second sentence, the first speaker identification information, the second speaker identification information, and a first weight parameter, and
a second model that outputs a second feature vector based on the text data of the first sentence, the text data of the second sentence, the first speaker change information, and a second weight parameter,
wherein the first model determines the first feature vector from the first sentence and the second sentence according to a first RNN-LSTM (Recurrent Neural Network-Long Short Term Memory) having the first weight parameter dependent on the first speaker identification information and the second speaker identification information, and
wherein the second model determines the second feature vector from the first sentence and the second sentence according to a second RNN-LSTM having the second weight parameter dependent on first speaker change information.

2. The dialogue act estimation method according to claim 1,
wherein the first training data further includes first speaker identification information indicating the speaker of the first sentence and second speaker identification information indicating the speaker of the second sentence.

3. The dialogue act estimation method according to claim 2,
wherein the model includes a third model that outputs a posterior probability of a dialogue act corresponding to the first sentence based on the first feature vector, the second feature vector, and a third weight parameter, and
wherein the learning is performed by performing error backpropagation between the posterior probability and the dialogue act information indicated by the first training data.

4. The dialogue act estimation method according to claim 1,
wherein the first training data is acquired from a corpus in which two or more pieces of training data are accumulated.

5. A dialogue act estimation system, comprising:
a microphone in a terminal that acquires sounds;
a processor in the terminal, that
determines whether the acquired sounds are uttered sentences of one or more speakers or noise,
outputs the uttered sentences only when the processor determines that the acquired sounds are uttered sentences of the one or more speakers and are not noise,
converts the uttered sentences of the one or more speakers to one or more formatted communication signals when the processor determines that the acquired sounds are uttered sentences of the one or more speakers, and
transmits the one or more formatted communication signals from the terminal over a communication network; and
a server, that
receives the one or more formatted communication signals;
converts the received one or more formatted communication signals to the uttered sentences of the one or more speakers; and
acquires first training data from the converted uttered sentences of the one or more speakers indicating, in a mutually associated manner, text data of a first sentence that can be a current uttered sentence, text data of a second sentence that can be an uttered sentence immediately previous to the first sentence, first speaker change information indicating whether a speaker of the first sentence is the same as a speaker of the second sentence, and dialogue act information indicating a class of the first sentence;
learns an association between the current uttered sentence and the dialogue act information by applying the first training data to a model; and
stores a result of the learning as learning result information in a memory,
acquires dialogue data including text data of a third sentence of a current uttered sentence uttered by a user, text data of a fourth sentence of an uttered sentence immediately previous to the third sentence, and second speaker change information indicating whether the speaker of the third sentence is the same as a speaker of the fourth sentence;
estimates a dialogue act to which the third sentence is classified by applying the dialogue data to the model based on the learning result information; and
generates a correct response to the uttered sentences of the one or more speakers,
wherein the model includes
a first model that outputs a first feature vector based on the text data of the first sentence, the text data of the second sentence, the first speaker identification information, the second speaker identification information, and a first weight parameter, and
a second model that outputs a second feature vector based on the text data of the first sentence, the text data of the second sentence, the first speaker change information, and a second weight parameter,
wherein the first model determines the first feature vector from the first sentence and the second sentence according to a first RNN-LSTM (Recurrent Neural Network-Long Short Term Memory) having the first weight parameter dependent on the first speaker identification information and the second speaker identification information, and
wherein the second model determines the second feature vector from the first sentence and the second sentence according to a second RNN-LSTM having the second weight parameter dependent on first speaker change information.

6. A plurality of non-transitory storage mediums storing computer-readable programs, the programs causing a plurality of computers to execute a process including:
acquiring sounds by a microphone in a terminal;
determining, by a processor in the terminal, whether the acquired sounds are uttered sentences of one or more speakers or noise;
outputting the uttered sentences to communication transmitter only when the processor determines that the acquired sounds are uttered sentences of the one or more speakers and are not noise;
converting the uttered sentences of the one or more speakers to one or more formatted communication signals when the processor determines that the acquired sounds are uttered sentences of the one or more speakers;

transmitting the one or more formatted communication signals from the terminal over a communication network to a server;

receiving the one or more formatted communication signals by the server;

converting the received one or more formatted communication signals by the server to the uttered sentences of the one or more speakers;

acquiring first training data by the server from the converted uttered sentences of the one or more speakers indicating, in a mutually associated manner, text data of a first sentence that can be a current uttered sentence, text data of a second sentence that can be an uttered sentence immediately previous to the first sentence, first speaker change information indicating whether a speaker of the first sentence is the same as a speaker of the second sentence, and dialogue act information indicating a class of the first sentence;

learning an association between the current uttered sentence and the dialogue act information by applying the first training data to a model;

storing a result of the learning as learning result information in a memory in the server;

acquiring dialogue data including text data of a third sentence of a current uttered sentence uttered by a user, text data of a fourth sentence of an uttered sentence immediately previous to the third sentence, and second speaker change information indicating whether the speaker of the third sentence is the same as a speaker of the fourth sentence;

estimating a dialogue act to which the third sentence is classified by applying the dialogue data to the model based on the learning result information; and generating a correct response to the uttered sentences of the one or more speakers, wherein the model includes
    a first model that outputs a first feature vector based on the text data of the first sentence, the text data of the second sentence, the first speaker identification information, the second speaker identification information, and a first weight parameter, and
    a second model that outputs a second feature vector based on the text data of the first sentence, the text data of the second sentence, the first speaker change information, and a second weight parameter, wherein the first model determines the first feature vector from the first sentence and the second sentence according to a first RNN-LSTM (Recurrent Neural Network-Long Short Term Memory) having the first weight parameter dependent on the first speaker identification information and the second speaker identification information, and wherein the second model determines the second feature vector from the first sentence and the second sentence according to a second RNN-LSTM having the second weight parameter dependent on first speaker change information.

* * * * *